July 2, 1957 J. R. WEST 2,797,795
REVERSIBLE RATCHET DRIVE MECHANISM
Filed April 30, 1953 5 Sheets-Sheet 1

Fig. 1

INVENTOR
James R. West
By Richard E. Babcock Jr.
ATTORNEY

July 2, 1957 J. R. WEST 2,797,795
REVERSIBLE RATCHET DRIVE MECHANISM
Filed April 30, 1953 5 Sheets-Sheet 3

INVENTOR
James R. West
By Richard E. Babcock Jr.
ATTORNEYS

July 2, 1957  J. R. WEST  2,797,795
REVERSIBLE RATCHET DRIVE MECHANISM
Filed April 30, 1953  5 Sheets-Sheet 5

INVENTOR
James R. West
By Richard E. Babcock Jr.
ATTORNEY

United States Patent Office 2,797,795
Patented July 2, 1957

2,797,795

REVERSIBLE RATCHET DRIVE MECHANISM

James R. West, New Holland, Pa., assignor, by mesne assignments, to Sperry Rand Corporation, New Holland, Pa., a corporation of Delaware Application April 30, 1953, Serial No. 352,175

16 Claims. (Cl. 198—203)

This invention relates to a reversible ratchet drive mechanism of a type which is particularly adapted for use in connection with farm wagon unloaders, though it is by no means restricted to this specific use.

In mechanisms such as are customarily employed for unloading farm wagons and the like it is usual to provide an endless chain or conveyor means movable over the floor of the wagon box for propelling the wagon contents toward the discharge end of such box.

In accordance with the instant invention, the conveyor mechanism is driven through reversely disposed ratchet wheels both coupled in driving relation to the conveyor mechanism, and these are selectively driven from a common oscillating drive member or arm whereby the conveyor mechanism may be caused at will either to unload the wagon contents or to return to its starting position preparatory to loading of the wagon box.

An outstanding feature of the invention is the provision of means whereby either of the relatively reversely disposed wheels may be selectively driven from a common drive element which carries the driving pawls or means for cooperation with both of said wheels.

A further feature consists in the utilization of a series of baffle sections interconnected for relatively coordinated adjustment between the ratchet wheels and their respective actuating pawls to permit selective actuation of either wheel by its respective pawls. Moreover the invention includes so arranging the respective baffle sections as to permit them to simultaneously disengage both of the driving pawls from their respective wheels, whereby the wheels will remain at rest despite continued driving movement of their common driving element which carries the pawls.

A further feature consists in so arranging the baffle sections that one of said sections may be interposed to varying degrees between its respective wheel and driving pawl to adjust the effective driving stroke of such pawl in engagement with the wheel, while the other driving pawl is retained out of operative engagement with its wheel throughout the entire range of such adjustment.

Moreover in the preferred embodiment of the instant invention, the various baffle sections for performing all of the foregoing functions may be formed as a single composite baffle element of integral construction.

An additional feature consists in utilizing the movement of the driven conveyor element or mechanism to automatically reverse such movement each time it approaches predetermined limits. This is accomplished by a projection or portion of the moving conveyor mechanism disposed for movement between and into abutment with relatively spaced movable reversing arms or members which are linked to the baffle element to adjust same for reversal of the drive mechanism each time either of the members is moved by engagement with said moving projection.

A still further feature consists in the novel association with said reversing arms or members of a control or rod associated therewith for facilitating manual control of the drive mechanism from a location convenient to the discharge end of the wagon box, whereby the mechanism may be completely controlled from such location without necessitating recourse to the hydraulic control system on the tractor or other primary source of power for the drive mechanism.

A still further feature consists in providing means for effecting adjustment of the said control element whereby same may act through the aforementioned reversing arms and baffle to regulate the amplitude of the step by step unloading movements of the conveyor mechanism.

The foregoing as well as other incidental objects and advantages are all attained by the preferred embodiment of the invention illustrated in the accompanying drawings in which.

Referring now in detail to the accompanying drawings, the invention is shown therein in its application to a conventional farm wagon, of which only the wagon box 1 of conventional construction is shown. It will be readily understood that the wagon box 1 will be supported on a usual wheeled chassis to be towed behind a usual farm tractor, though both the tractor and the wheeled chassis are omitted from the accompanying drawings as neither of these constitutes part of the present invention. Endless conveying means comprising the chains 2 each have an upper run movable over the floor of the wagon box, such chains being supported around sprockets 3 and 4 respectively. The sprockets 4 are supported on a shaft 5 journalled in bearings 6 beneath the rear end of the wagon box. The sprockets 3 at the forward end of the wagon box are similarly supported on and keyed to a shaft 7 which is rotatably supported beneath the front end of the wagon box in bearings 8 fixed to such box. In the present embodiment the conveyor mechanism is of the type which includes a false end gate or pusher element 9 which is connected to the respective chains 2 so that the movement of the chains is utilized to draw the pusher or load ejector 9 in an endwise direction through the wagon box, as indicated by the arrow in Figure 1, to discharge the contents of the wagon box through its rear or right hand end. In the embodiment shown, this pusher 9 is supported on suitable base members 10 for sliding movement along the bottom of the box 1, the upper end of the pusher preferably being supported against deflection by upright braces 11 extending between it and the base members 10.

Figure 1:
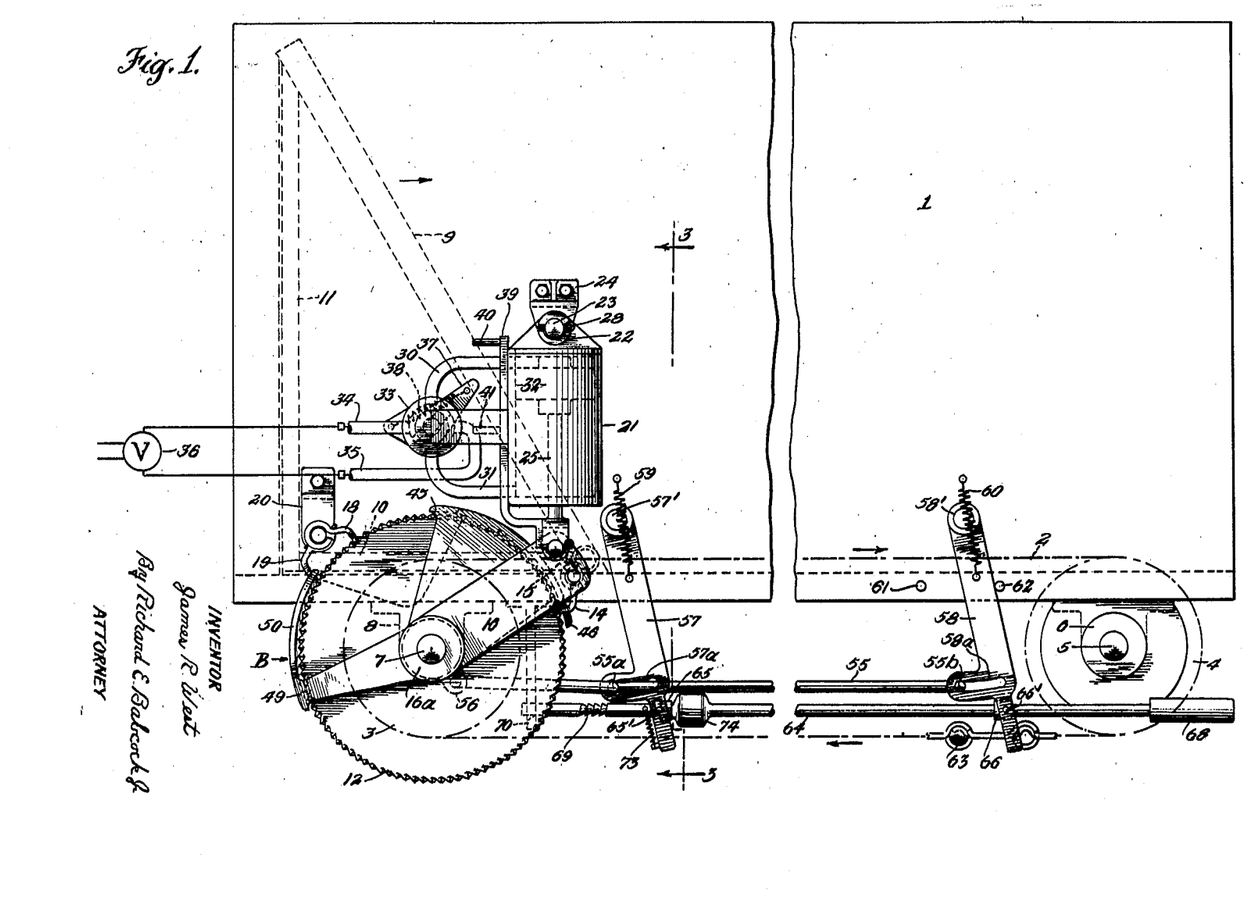
Figure 1 is a side elevational view of an automatic wagon unloader partly broken away to condense the figure and indicating a control valve diagrammatically which may be located on a propelling tractor or the like and showing the movable conveyor means in position ready for unloading movement and with the power unit adjusted for maximum unloading stroke.

Movement of the chains 2 and pusher 9 is caused by rotation of the driven sprockets 3 by the novel ratchet wheel drive mechanism of the invention. Such mechanism comprises a pair of relatively reversely disposed ratchet wheels 12 and 13 keyed on the driven shaft 7 in adjoining relation. By the term "reversely disposed" it is meant that the teeth of the ratchet wheels 12 and 13 are disposed or face in opposite directions whereby the teeth 12a of the ratchet wheel 12 may function to operatively engage a driving pawl 14 disposed to move the wheel 12 in a clockwise direction (as seen in Figure 1) and the teeth 13a of wheel 13 are faced in an opposite direction to permit such wheel 13 to be driven in a counter-clockwise direction by its respective driving pawl 15. Both of the driving pawls 14 and 15 are pivotally mounted on the free end of a drive arm 16 which is journalled on the drive shaft 7 by means of its hub 16a for oscillation about the axis of shaft 7. The said pawls 14 and 15 have oppositely directed free ends for cooperation with the oppositely disposed ratchet teeth of their respective wheels.

Holding pawls 18 and 19 are pivoted on a bracket 20 on the side of the wagon box 1, these pawls being relatively oppositely directed for holding engagement in opposite directions with their respective wheels 12 and 13.

Any suitable power means may be employed for oscillating the drive arm 16 through a constant amplitude, whereby one or the other of its drive pawls 14 or 15 may operatively engage and rotate its respective ratchet wheel. The power means illustrated by way of exemplification is of a type which may be readily driven from the usual hydraulic power system of the tractor which tows the wagon box 1, and is similar in all material respects to the corresponding means disclosed in the pending joint application of Lawrence H. Skromme and myself, Serial No. 302,272, filed August 1, 1952, and now Patent No. 2,712,388, for Wagon Body Unloader.

Such means comprises a double acting extensible and retractible jack which may conveniently comprise the standard removable hydraulic unit of the tractor which tows the wagon box 1. The cylinder 21 of this unit is provided at one end with a bearing 22 which is journalled on a pin 23 carried on a supporting bracket 24 fixed to the side of the wagon box 1.

The exterior end of the piston rod of such unit terminates in a clevis 26 which is pivotally connected at 27 to the outer end of the drive arm 16. The bearing 22 and clevis 26 are preferably removably positioned on their respective pins 23 and 27 by easily removable cotter pins 28 and 29 so that the cylinder and piston unit may be readily removed and reapplied to the tractor or other mechanism.

Fluid conduits 30 and 31 communicating with the interior of cylinder 21 on opposite sides of the piston 32 therein are connected to and receive fluid under pressure from a reversing valve 33 mounted on the cylinder 21. This reversing valve 33 in turn has fluid under pressure circulated therethrough through supply and exhaust conduits 34—35 respectively, preferably through a control valve 36 from a suitable source of supply which may comprise the hydraulic power system of the tractor which draws the wagon box.

Valve 33 which may comprise any conventional type of rotary reversing valve is automatically reversed at the end of each stroke of piston 32 to thus reverse the piston automatically and cause a continuous reciprocation of the piston.

For this purpose a toggle control arm 37 is fixed to the rotary valve core or rotor radially to its rotational axis and an overcenter spring 38 connected between the free end of the arm and the casing of the valve 33 cooperates with the arm 37 to normally maintain the valve rotor in either of its relatively reversed positions on opposite sides of dead center.

For the purpose of actuating the toggle arm at proper times, the piston rod 25 carries a bar 39 which extends parallel to the rod 25 exteriorly of the cylinder. At spaced intervals on this bar are disposed studs 40 and 41. The stud 40 is positioned to abut against the arm 37 and swing it past dead center position to reverse the valve 33 as piston 32 approaches its outward or downward stroke. Stud 41 is positioned to engage the arm 37 and swing it past dead center to reverse the valve 33 as the piston 32 approaches the end of its return or upward stroke. It will be therefore apparent that the constant reciprocation of piston 32 will act through the piston rod 25 to produce a constant oscillation of the driving arm 16.

An arcuate shield or baffle member supported by legs 43a and 43b on the hub members 44a and 44b respectively for adjustment concentrically about the axis of drive shaft 7 comprises a section 45 overlying the unloading wheel 12 and a section 46 overlying the return wheel 13, these sections being interconnected in such relative positions to the driving pawls 14 and 15 as to be adapted either for alternate or simultaneous interpositioning between the driving pawls and their respective wheels 12 and 13, whereby either of these wheels may be driven by its respective pawl while the other driving pawl is held out of engagement with its wheel and thus avoids interference with the rotation thereof. Where the sections 45 and 46 are simultaneously interposed between the driving pawls 14, 15, and the respective wheels, no driving motion will be imparted to the wheels 12 and 13 and they will remain at rest despite the constant driving oscillation of arm 16.

A further arcuate shield or baffle member concentric with the respective wheels 12 and 13 is supported by legs 47a and 47b on the hub members 44a and 44b respectively for adjustment about the drive shaft 7. This baffle member includes sections 49 and 50 respectively disposed for alternate interpositioning between their respective cooperating holding pawls 18—19 and wheels 12—13 to permit alternate operation of either of these pawls in conjunction with its respective wheels, while the holding pawl is held inoperative to avoid interference with the rotational movement of the wheels and shaft 7.

The baffle sections 45 and 46 are interconnected with the baffle sections 49 and 50 through their common hub members 44a and 44b for simultaneous coordinated movement relative to their respective pawls, the circumferential positioning and extent of the baffle sections 45 and 46 relative to the sections 49 and 50 being such that each section 49 or 50 renders its respective holding pawl 18 or 19 inoperative at the same time its cooperating driving pawl 14 or 15 is rendered inoperative by either of the baffle sections 45 or 46, the remaining pawls being permitted to operatively engage their respective wheel and thus cause rotation of the wheels 12 and 13 and shaft 7 without interference from the pawls thus held inoperative.

In the instant embodiment, all of the baffle sections 45, 46, 49 and 50 are incorporated in a single integral baffle element which for purposes of convenient reference is designated B in its entirety. However, such integral or unitary construction of the baffle sections is not essential to my invention considered from its broader aspects, so long as the several baffle sections are interconnected for coordinated movement and operation in the manner above mentioned.

Figure 3:
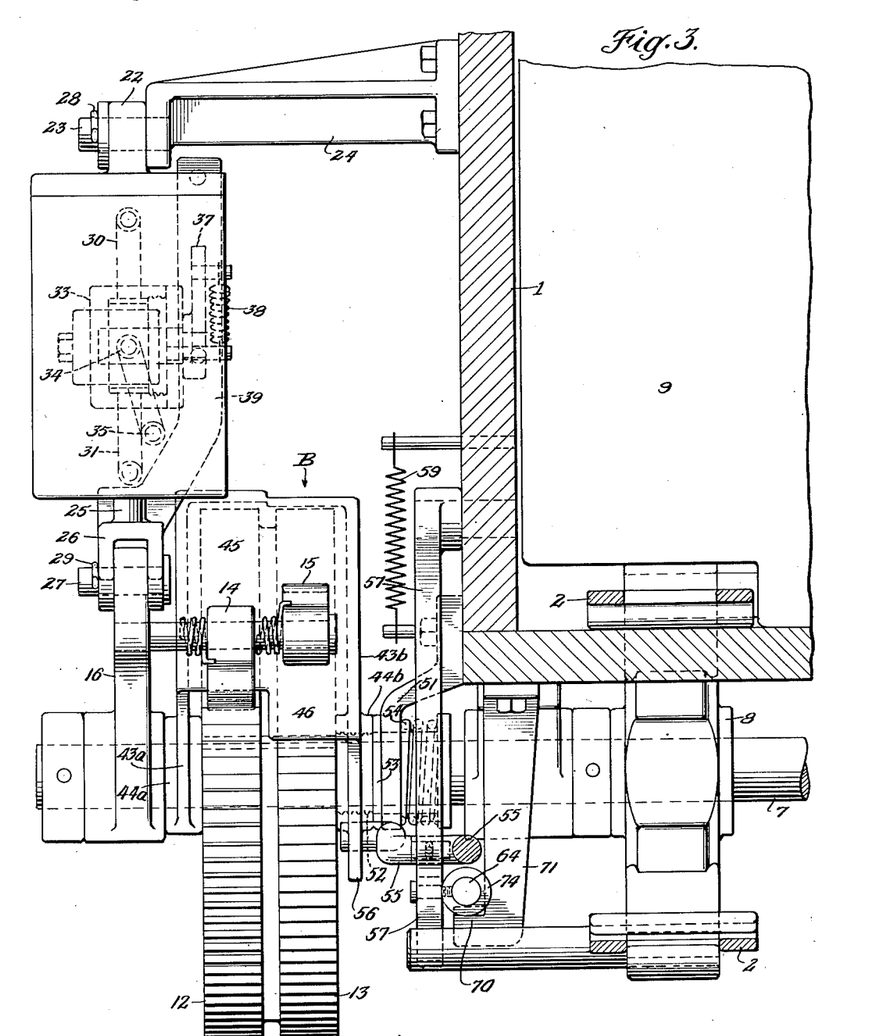
Figure 3, a fragmentary cross-section taken substantially on the line 3—3 of Figure 1.

As may be seen in Figure 3 suitable friction means may be provided in the drive shaft between the baffle hub 44b and a fixed bracket 51 carried by the wagon box 1. This means comprises a flanged sleeve 52 threaded into the hub 44b, a friction washer 53 between the hub and the fixed bracket 51, and a spring 54 disposed about the sleeve 52 under compression between the fixed bracket 51 and the flange of the sleeve. Thus the baffle element B comprising the several sections 45, 46, 49, and 50 is frictionally held in adjusted position against any tendency for rotative movement due to rotation of the ratchet wheels 12 and 13 or reciprocation of the driving pawls 14 and 15.

Rotary adjustment of the baffle element B to selectively cause either clock-wise or counter-clockwise movement of the ratchet wheels 12, 13 and drive shaft 7 may be controlled through actuation of a link 55 pivotally connected to a crank arm or projection 56 on the baffle element B, the link 55 being supported on and pivotally connected at 55a and 55b to depending arms 57 and 58 respectively, the upper ends of which are pivotally connected to the wagon box at 57' and 58'. For reasons hereinafter appearing the pivots 55a, and 55b, which are formed in the present embodiment by right angularly bent portions of the link 55, are received in slots 57a and 58a in the lower ends of the arms 57 and 58 to permit a predetermined amount of lost motion between the arms and link 55. Thus it will be seen that the link 55 is supported for substantially reciprocatory movement or adjustment by the arms 57 and 58.

The arms 57 and 58 have over-center tension springs 59 and 60 respectively associated therewith, each such spring being connected between its respective arm and the wagon box at locations on opposite sides of the arm pivot 57' or 58' to thus retain the arms, and through them the link 55 in either of the extreme operative positions of adjustment of the latter. These positions are accurately determined by limit stops 61 and 62 fixed to the wagon box on opposite sides of the arm 58 as will be seen by reference to Figure 1.

Figure 5:
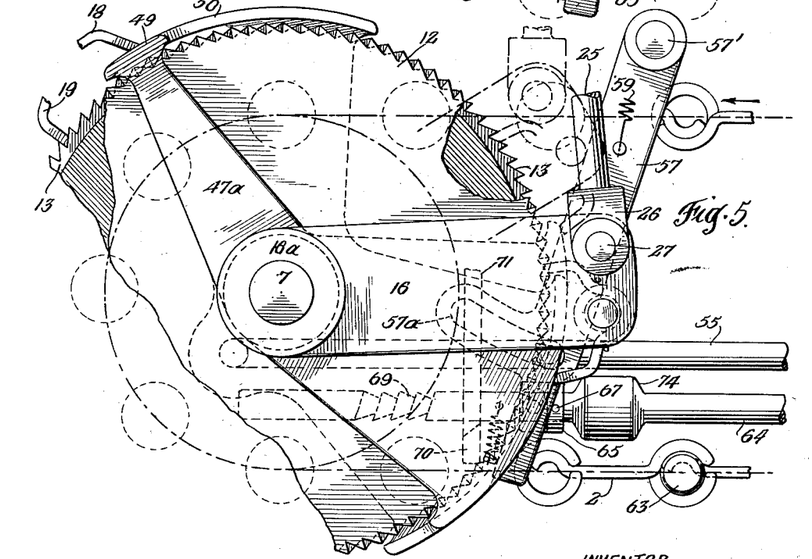
Figure 5, a fragmentary elevation showing the unit adjusted in reversing position.

Thus in the position shown in Figure 1, the baffle B is adjusted to permit operative engagement with the unloading ratchet wheel 12 of its associated driving and holding pawls 14 and 18 respectively, whereby oscillation of the arm 16 will cause unloading movement of the pusher 9 toward the rear end of the wagon box as indicated by the arrow in Figure 1. In the reverse position of the arms 57 and 58 shown in Figure 5, it will be seen that the pawls 14 and 18 are rendered inoperative by the baffle B while the driving pawl 15 and holding pawl 19 are permitted to engage and rotate their associated return wheel 13 in a direction to return the pusher or load moving element 9 to the position 1.

Obviously, the link 55 may be directly manually actuated if desired to cause either unloading or return movement of the load moving element 9, and to this end may be relied upon as the sole control means for the drive mechanism comprising the ratchet wheels 12, 13 and their associated driving and holding pawls, or should it be desired to further simplify the mechanism of the invention, the link 55 may be eliminated and the adjustment of the baffle B may be directly manually controlled or actuated.

However, the provision of the arms 57 and 58 and link 55 is of definite advantage since the arms may cooperate with a laterally projecting pin 63 moving between them on the lower run of the adjacent chain 2, the position of the arms being such that the pin 63 will engage one of them to reverse the direction of the movement of the load moving element 9 each time the said element approaches the end of its unloading or return runs.

With the mechanism thus far described, it is possible to cause either unloading or return movement of the unloading element 9 in step by step movements of constant or unvarying amplitude in either case.

It is desirable to be able to adjust the amplitude of the steps in the unloading movement in increments from zero to a predetermined maximum, whereby the unloading element 9 may be held stationary or advanced in an unloading direction in varying speeds to suit varying operating conditions, all without varying the rate or amplitude of oscillation of the driving arm 16 or the power means for same.

Figure 6:
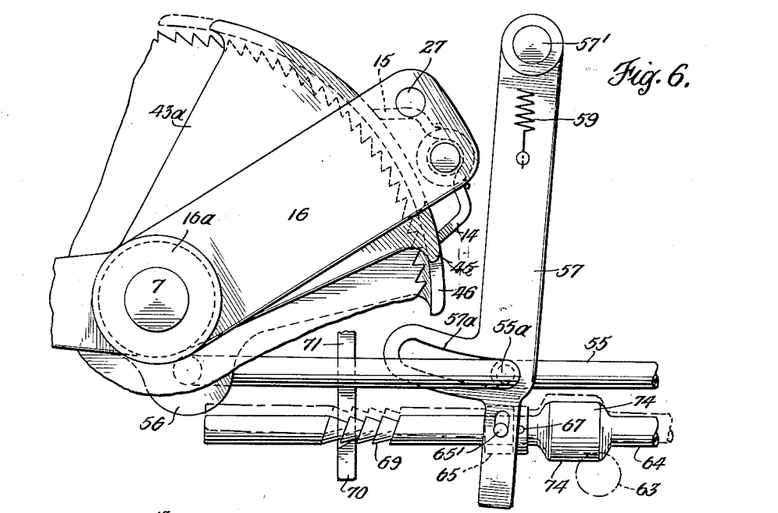
Figure 6, a fragmentary elevation showing the unit adjusted in shortened unloading stroke position, or in other words with the baffle element disposed to permit engagement between the driving pawl and its respective unloading wheel throughout a portion only of the operative stroke of such pawl.
Figure 7:
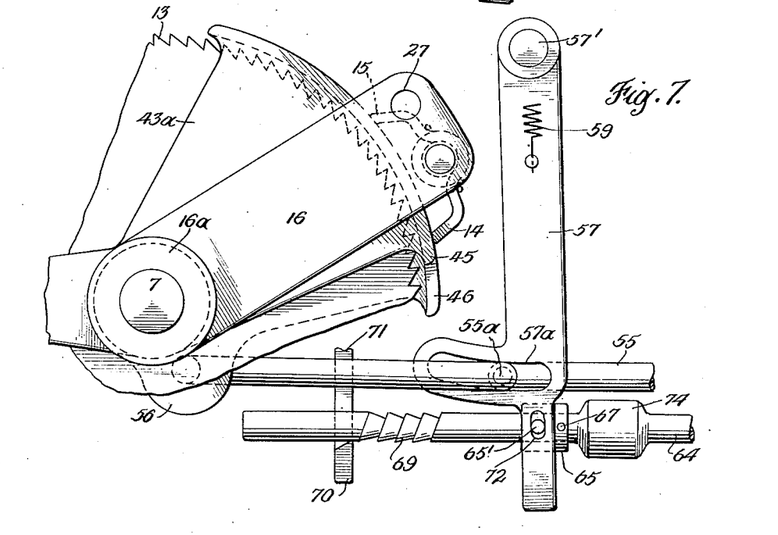
Figure 7, a fragmentary elevation showing the unit with its control rod pulled outwardly from the position of Figure 6 to a point just over center of the reversing arm, at which time the over center spring associated with such arm comes into action to move the mechanism into maximum adjusted position for full stroke.

I accomplish this by means of a control element or rod 64 supported by the arms 57 and 58 in substantially parallel relation to the link 55 by means of sleeves 65, 66 each pivotally carried by its respective arm as at 65', 66' respectively. The rod 64, which is of round cross-section, is freely rotatable in its sleeves 65 and 66 but is held against axial movement therein by suitable means, as exemplified in Figures 6 and 7 by a pin 67 projecting radially through these sleeves 65 with its inner end received in an annular groove in the rod 64 internally of the sleeve.

Adjacent the discharge of rear end of the wagon box 1, the control rod 64 terminates in an operating handle 68. Adjacent its forward free end, it is provided with a series of ratchet teeth, preferably in the form of several convolutions of a spiral ratchet thread 69 the operative face of which is directed forwardly of the wagon box for cooperation with an oppositely cammed detent 70 defined by the laterally projecting arm of a bracket 71 fixed on the wagon box 1. It will be seen that the ratchet thread 69 is free to move rearwardly of the wagon box or to the right in Figures 6 and 7 over the detent 70, but cannot return forwardly past said detent without being raised to clear same, as indicated in broken lines in Figure 6.

In order to permit such vertical movement of the spirally threaded rod section 69, as may be required to permit it to ride over the detent 70 in either direction, the pivot 65' of the forward rod supporting sleeve 65 is vertically movable in a slot 72 in its respective supporting arm 57. Normally the rod 64 is resiliently urged downwardly into engagement with the detent 70 by means of a tension spring 73 connected between the rod and supporting rod 57 as in Figures 1 and 4.

A cylindrical cam 74 carried by the rod 64 adjacent the arm 57 is positioned for cooperation with the actuating pin or means 63 on the lower run of chain 2 whereby just before the pin 63 engages the arm 57 at the end of the unloading movement of pusher 9 to move the arm 57 to the left past dead center in Figure 1 and thus institute return movement of the pusher 9, the pin 63 engages beneath the cylindrical cam 74 to raise same and the rod 64, whereby the ratchet threads 69 may freely move to the left above the detent 70. This is best illustrated in broken lines in Figure 6.

Figure 2:
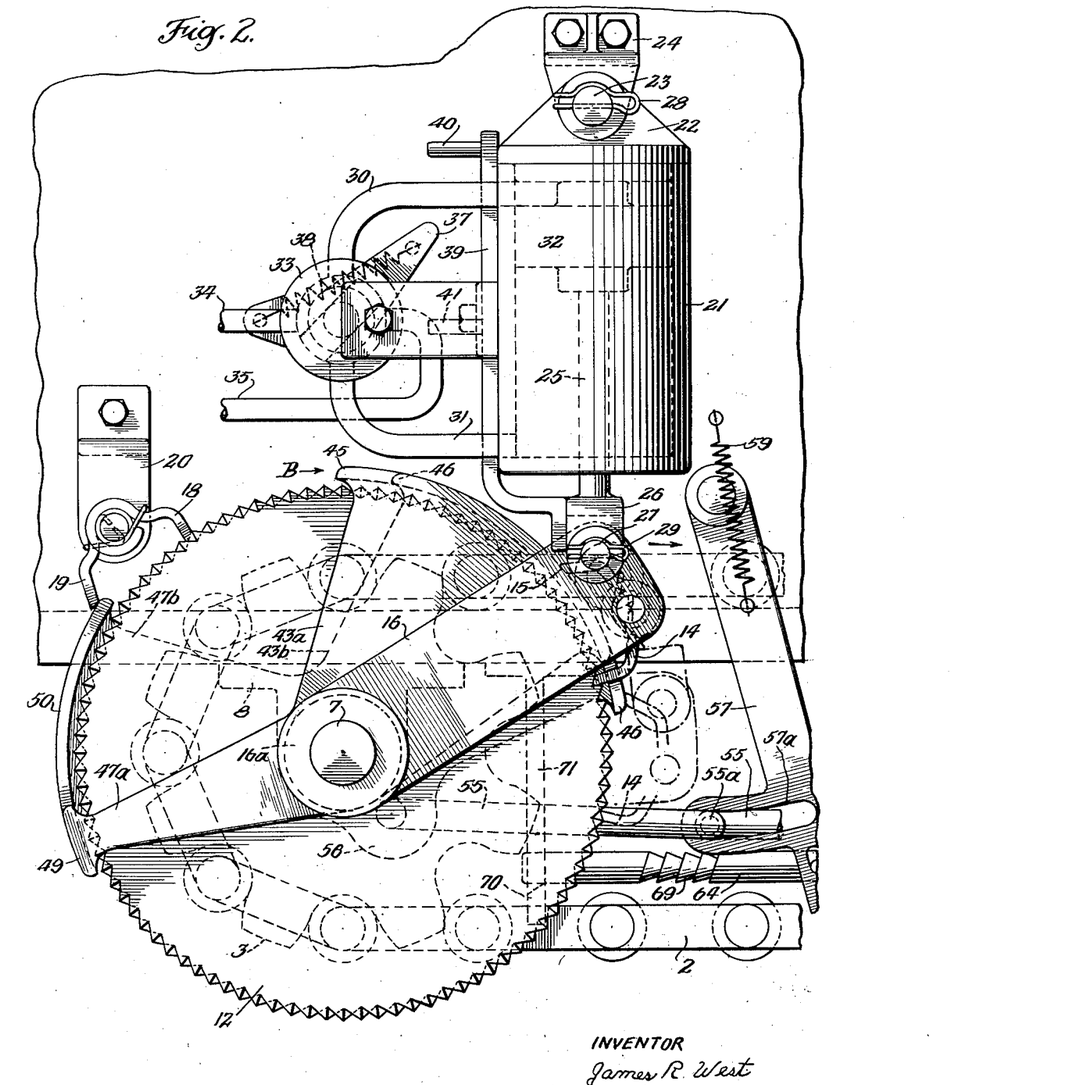
Figure 2, an enlarged fragmentary elevational view of the drive unit with the parts in the same position as in Figure 1.

With the foregoing arrangement, assuming the unloading element is to be moved in an unloading direction in steps of maximum amplitude (thus at its maximum speed) then the adjusting rod 64 is pulled all the way rearwardly as in Figures 1 and 2. This rocks the arms 57 and 58 to the right and pulls the baffle operating link 55 to the right to thus rotate the baffle element B counter-clockwise so that the baffle section 45 will permit full engagement of the ratchet wheel 12 by its driving pawl 14 throughout substantially the full range of oscillation of the driving arm 16. In the present embodiment, this range will be equal to the circumferential extent of 8 teeth on the ratchet wheel 12 as indicated in Figure 2 in which the pawl 14 is shown in full lines at the beginning of its stroke and in dotted lines at the end thereof.

Thus on each downward operative stroke of the piston 32 the pawl 14 will operatively engage and rotate the ratchet wheel 12 to an extent equaling the circumferential space occupied by 8 ratchet teeth.

At this time it will be noted that the baffle section 49 is positioned to permit cooperation of the holding pawl 18 with the wheel 12 in usual manner while the baffle sections 46 and 50 are positioned to block off their respective pawls 15 and 19 from engagement with the wheel 13. Thus these pawls 15 and 19 are incapable of opposing the rotation of the ratchet wheels 12 and 13.

The ensuing clockwise rotation of the ratchet wheels 12, 13, shaft 7 and drive sprockets 3 will of course move the upper run of the chains 2 rearwardly through the wagon box and will thus cause unloading movement of the pusher or unloading element 9 at its maximum rate of speed. Step by step movement in steps of maximum extent will continue until the pusher 9 reaches the end of its unloading movement or until other adjustment of the control rod 64 is made.

When the pusher or ejector 9 reaches the end of its unloading movement the pin 63 carried by the lower run of the chain 2 first engages the cylindrical cam 74 on the control rod 64 to raise the free end of this rod so that its ratchet threaded portions 69 may move freely to the left above the detent 70. Then the left hand arm 57 is engaged by the pin 63 to move it to the left beyond dead center. Both arms 57 and 58 will move together due to their connection through the control rod 64, and as soon as these pass dead center position their overcenter springs 59 and 60 respectively will quickly snap them completely to the left in advance of the pin 63 with the right hand arm 58 in engagement with its limit stop 61, thereby causing the link 55 to rotate baffle B to the position shown in Figure 5 to cause reversal of the driving mechanism. Thus the lost motion slots 57a and 58a and the overcenter springs 59 and 60 respectively advance the arms 57 and 58 relative to the pin 63 and provide sufficient clearance between the arm 57 and pin 63 to permit a slight lag between the movement of the arm 57 and the reversing movement of the chain 2 without damage either to the arm or chain.

In this position the unloading driving pawl 14 is held disengaged and the baffle section 46 is withdrawn to permit operative engagement between the return drive pawl 15 and the wheel 13, while the baffle section 50 is withdrawn to permit operative engagement between the holding pawl 19 and wheel 13. At the same time, the baffle sections 45 and 49 are interposed between the unloading wheel 12 and its cooperating pawls 14 and 18 respectively to completely block off operative engagement between same. Thus upon each upward or retraction stroke of the piston 32 the return wheel 13 will be rotated in a counterclockwise direction. This moves the upper run of the chains 2 to the left and returns the pusher 9 to its starting position.

Upon returning to starting position, the pin 63 may engage the right hand or rear arm 58 to return the arms and associated mechanism to the position of Figure 1, whereupon the pusher 9 will again move in an unloading direction unless the control rod 64 is actuated in the manner hereinafter mentioned to bring it to rest. In this movement, the threads 69 of the control rod 64 merely ride over the detent 70.

When it is desired to reduce the unloading speed by permitting operative engagement between the unloading wheel 12 and its drive pawl 14 throughout a portion only of the operative stroke of the latter, this may be done by moving the control rod 64 to the left from the position shown in Figure 1 until the first or left hand convolution of the ratchet thread 69 catches on the fixed detent 70, and then rotating the rod 64 as desired whereby movement of the rod 64 will permit movement of the arms 57 and 58 to the left under the action of their over center springs 59 and 60.

This will rotate the baffle to progressively interpose the baffle section 45 between the wheel 12 and its driving pawl 14 within the range of operative movement of the latter.

Thus the range of operative engagement between the driving pawl 14 and its associated wheel 12 may be progressively shortened as desired.

Figure 4:
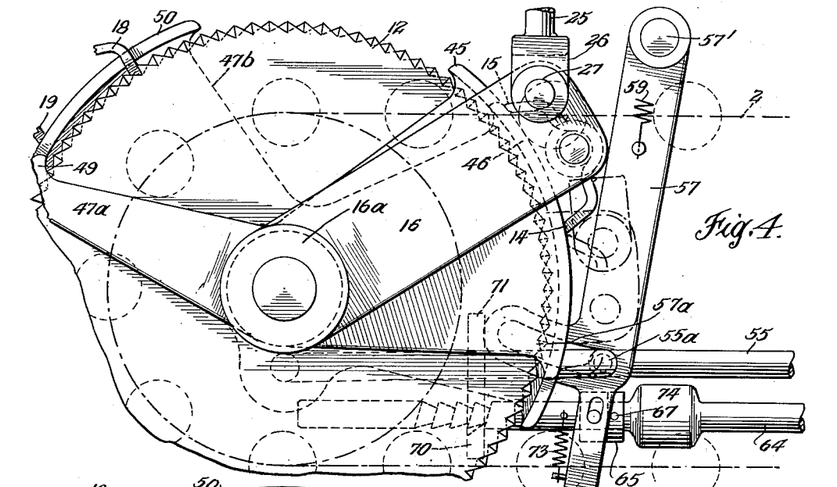
Figure 4, a fragmentary elevation showing the unit adjusted in a neutral or idling position.

When it is desired to stop the pusher 9 the mechanism is placed in neutral or idling position by continuing such rotation of the rod 64 until the rearmost or right hand thread of the convolutions 69 thereof engages the detent 70 as shown in Figure 4. This moves the baffle B to a position in which the baffle sections 45 and 46 are interposed between both driving pawls 14 and 15 and their respective wheels 12 and 13 throughout the range of oscillating movement of these pawls and the mechanism will therefore idle without moving the pusher 9.

Because of the lost motion slots 57a and 58a in the arms 57 and 58, adjustment from such idling position to shortened unloading stroke can only be accomplished by first moving the control rod 64 to the maximum unloading stroke position of Figure 1 and then pushing it to the left and turning it to the desired point of adjustment as mentioned in the preceding paragraphs. This will be apparent when it is realized that adjustment of the rod 64 from the neutral position of Figure 4 directly to the slow speed position of Figure 6 would result only in lost motion of the pivots 55a and 55b in the lost motion slots 57a and 58a without imparting any control movement to the arms 57 and 58 or the link 55. It is not until the arms 57 and 58 move over center to the position of Figure 1 that movement of the baffle B will take place under the influence of the over center springs 59 and 60, for instance as is about to occur in Figure 7 wherein is shown the position of the parts when the control rod 64 has been pulled rearwardly from the position of Figure 6 to a point where the arm 57 is just over center to the right or rear, at which time the over center spring 59 acts to move the arm 57 toward its full right hand position.

In the present application, I have shown and described only the preferred embodiment of my invention simply by way of illustration of the preferred mode contemplated by me of carrying out my invention as required by law. However, I recognize that my invention is capable of other and different embodiments and that its several details may be modified in various ways all without departing from the said invention.

Accordingly, the drawings and description herein are to be construed as merely illustrative in nature.

Having thus described my invention, I claim:

1. Reversible conveyor driving mechanism comprising a pair of relatively reversely disposed ratchet wheels mounted for rotation about a common axis, a drive element, power means for causing harmonic motion of same transversely to said common axis, driving pawls carried by said drive element for operative engagement with the respective wheels, holding pawls operatively associated with the respective wheels, and baffle means comprising a unitary structure overlying the peripheries of both said wheels and selectively interposable between either of said wheels and its respective driving and holding pawls to render same inoperative while exposing the other of said wheels for coaction with its cooperating driving and holding pawls, said baffle means being adjustable about said common axis.

2. Conveyor driving mechanism comprising a pair of relatively reversely disposed ratchet wheels mounted for rotation about a common axis, a drive element oscillatable about said common axis, power means for oscillating same, driving pawls carried by said drive element for operative engagement with the respective wheels, holding pawls operatively associated with the respective wheels, and baffle means comprising a unitary structure overlying the peripheries of both said wheels and selectively interposable between either of said wheels and its respective driving and holding pawls to render same inoperative while exposing the other of said wheels for coaction with its cooperating driving and holding pawls, said baffle means being adjustable about said common axis.

3. Reversible conveyor driving mechanism comprising a first ratchet wheel and a second ratchet wheel, disposed for relatively reverse rotation about a common axis and connected to a common driven member, a drive element oscillatable about said common axis and power means for oscillating same, driving pawls carried by said drive element for operative engagement with the respective wheels, holding pawls operatively associated with the respective wheels, and a baffle adjustable about said common axis, said baffle having a section adjustable therewith to expose said first wheel for coaction with its driving pawl for varying portions of the stroke of the latter, and sections positioned to prevent operative engagement of the second wheel by its respective pawls throughout such exposure of the first wheel, said first named section of the baffle being positioned to prevent engagement of the first wheel by its driving pawl as the baffle is adjusted to expose the said second wheel for operative engagement by its respective pawls, and means for rendering the holding pawl of said first wheel inoperative during said last mentioned adjustment.

4. Reversible conveyor driving mechanism comprising a first ratchet wheel and a second ratchet wheel, disposed for relatively reverse rotation about a common axis and connected to a common driven member, a drive element, power means for causing harmonic motion of said drive elements transversely to said common axis, driving pawls carried by said drive element for operative engagement with the respective wheels, holding pawls operatively associated with the respective wheels, and a baffle adjustable about said common axis, said baffle having a section adjustable therewith to expose said first wheel for coaction with its driving pawl for varying portions of the driving stroke of the latter, and sections positioned to prevent operative engagement of the second wheel by its respective pawls throughout such exposure of the first wheel, said first named section of the baffle being positioned to prevent engagement of the first wheel by its driving pawl as the baffle is adjusted to expose the said second wheel for operative engagement by its respective pawls.

5. A reversible conveyor driving mechanism comprising a first ratchet wheel and a second ratchet wheel, disposed for relatively reverse rotation about a common axis, a drive element oscillatable about said common axis and power means for oscillating same, driving pawls carried by said drive element for operative engagement with the respective wheels, holding pawls operatively associated with the respective wheels, and a baffle disposed for adjustment between said wheels and their respective pawls, said baffle having a section adjustable therewith to expose said first wheel for coaction with its driving pawl for varying portions of the driving stroke of the latter, and sections positioned to prevent operative engagement of the second wheel by its respective pawls throughout such exposure of the first wheel.

6. Reversible conveyor driving mechanism comprising a pair of relatively reversely disposed ratchet wheels connected for simultaneous rotation about a common axis, a drive element oscillatable about said common axis, power means for oscillating same at a constant amplitude of oscillation, driving pawls carried by said drive element for operative engagement with the respective wheels, holding pawls operatively associated with the respective wheels, baffle means selectively interposable between either of said wheels and its respective driving and holding pawls to permit the coaction of the other said wheel and its drive pawl to intermittently rotate said wheels, a pair of control arms and means movably supporting same in spaced relation, means linking said arms to each other and to said baffle means, whereby movement of said arms may cause adjustment of said baffle means, in combination with a conveyor driven by said mechanism, and means carried by said conveyer for movement between and into alternate operative engagement with said respective control arms.

7. The combination of claim 6 in which said baffle means comprises an integral baffle element adjustable about said common axis between predetermined limits of adjustment.

8. Reversible driving mechanism comprising a pair of relatively reversely disposed ratchet wheels connected for simultaneous rotation about a common axis, a drive element oscillatable about said common axis, power means for oscillating same at a constant amplitude, driving pawls carried by said drive element for operative engagement with the respective wheels, holding pawls operatively associated with the respective wheels, baffle means selectively interposable between either of said wheels and its respective driving and holding pawls to permit the coaction between the other said wheel and its driving pawl to intermittently rotate said wheel, a pair of control arms and means movably supporting same in spaced relation, means linking said arms to each other and to said baffle means, whereby said movement of said arms may cause adjustment of said baffle means, and stop means associated with one of said arms for determining the opposite extremities of such adjustment, such extremities being chosen to coincide with the said selective positions of the baffle, in combination with an element operatively connected to and driven by said driving mechanism through a predetermined path of movement, and means carried by said element for movement between and into alternate operative engagement with said respective control arms.

9. In combination with a conveyor having a generally horizontally moving portion, reversible conveyor driving mechanism comprising a first ratchet wheel and a second ratchet wheel, these being disposed for relatively reverse rotation about a common axis and connected to a common drive member, a drive element oscillatable about said common axis and power means for oscillating same, driving pawls carried by said drive element for operative engagement with the respective wheels, holding pawls operatively associated with the respective wheels, and a baffle adjustable about said common axis, said baffle having a section adjustable therewith to expose said first wheel for coaction with its driving pawl for varying portions of the driving stroke of the latter, and sections positioned to prevent operative engagement of the second wheel by its respective pawls throughout such exposure of the first wheel, said first named section of the baffle being positioned to prevent engagement of the first wheel by its driving pawl as the baffle is adjusted to expose the said second wheel for operative engagement by its respective pawls, and means for rendering the holding pawl of said first wheel inoperative during said last mentioned adjustment in combination with a pair of relatively horizontally spaced control arms and means linking said baffle to said arms for adjustment responsive to movement theerof, a pin carried by said horizontally moving portion of the conveyor for movement therewith between and into operative engagement with said arms, a generally horizontal control rod rotatably supported by said arms and having a limited degree of vertical movement relative to one of said arms, a detent supported beneath said rod, said rod having a ratchet threaded section for operative engagement with said detent, cam means on said rod cooperating with said pin to raise said threaded section of the rod out of engagement with said detent as said pin approaches said one arm, whereby the rod will be free to move with said one arm.

10. In combination with a conveyor having a generally horizontally moving portion, reversible conveyor driving mechanism comprising a pair of relatively reversely disposed ratchet wheels connected for simultaneous rotation about a common axis, a drive element oscillatable about said common axis and power means for oscillating same, driving pawls carried by said drive element for operative engagement with the respective wheels, holding pawls operatively associated with the respective wheels, and a baffle adjustable about said common axis for selective interpositioning between said wheels and their respective pawls, in combination with a pair of relatively horizontally spaced control arms, means linking said baffle to said arms for adjustment responsive to movement thereof, a projection carried by said conveyor being disposed for movement between said arms to abut against and move same.

11. The combination of claim 10 including a generally horizontal control rod rotatably supported by said arms for movement therewith and having a limited degree of vertical movement relative to one of said arms, a detent supported beneath said rod, said rod having a ratchet threaded section for operative engagement with said detent, cam means on said rod cooperating with said projection to raise said threaded section out of engagement with said detent as said projection approaches said one arm, whereby the rod will be free to move with said one arm responsive to its engagement by said projection.

12. The combination of claim 10 including a generally horizontal control rod supported by said ams for movement therewith and having a limited degree of vertical movement relative to one of said arms, a detent supported beneath said rod, said rod having a ratchet toothed section for operative engagement with said detent, cam means on said rod cooperating with said projection to raise the toothed section of the rod out of engagement with said detent as said projection approaches said one arm, whereby the rod will be free to move with said one arm responsive to its engagement by said projection.

13. In combination with a conveyor having a generally horizontally moving portion, reversible conveyor driving mechanism comprising a pair of relatively reversely disposed ratchet wheels mounted for rotation about a common axis, a drive element oscillatable about said common axis and power means for oscillating same, driving pawls carried by said drive element for operative engagement with the respective wheels and a baffle adjustable about said common axis for interpositioning between said wheels and their respective pawls, in combination with a movable control arm operatively connected to said baffle to control the adjustment thereof, means mounting the control arm for controlling movement, and a projection carried by said conveyor for engaging and causing control movement of said control arm.

14. The combination of claim 13 including a generally horizontally disposed control rod connected to said arm for pivotal and vertical movement, a detent and means supporting same beneath said rod, said rod having a toothed section for operative engagement with said detent, whereby said detent and said toothed section may cooperate to retain the rod in various positions of endwise adjustment, cam means on said rod cooperating with said projection to raise said toothed section of the rod out of engagement with said detent as the projection approaches said arm.

15. In combination with a conveyor having a rectilinear moving portion, reversible drive mechanism operatively connected to said conveyor, means for reversing said drive mechanism, a pair of control arms spaced apart in the direction of movement of said conveyer, means supporting said arms for operative movement, means linking said arms to the reversing means to actuate said means responsive to operative movement of either of said arms, and a projection carried by said conveyor for movement between and into operative actuating engagement with said arms.

16. In combination with a conveyor having a rectinearly moving portion, reversible drive mechanism operatively connected to said conveyor, means for reversing said drive mechanism, a control arm and means supporting same for operative movement adjacent said conveyer, means linking said arm to the reversing means to actuate said reversing means responsive to operative movement of said arm, and a projection carried by said conveyor for engaging and operatively moving said arm.

References Cited in the file of this patent

UNITED STATES PATENTS

| 316,089 | Weston | Apr. 21, 1885 |
| 1,163,500 | Ball | Dec. 7, 1915 |
| 2,103,128 | Walter | Dec. 21, 1937 |
| 2,477,599 | Hammann | Aug. 2, 1949 |
| 2,488,766 | DeMoss | Nov. 22, 1949 |